Sept. 28, 1948.　　　F. H. PRITCHARD　　　2,450,300
TRACTION MOTOR CONTROL SYSTEM
Filed March 26, 1947
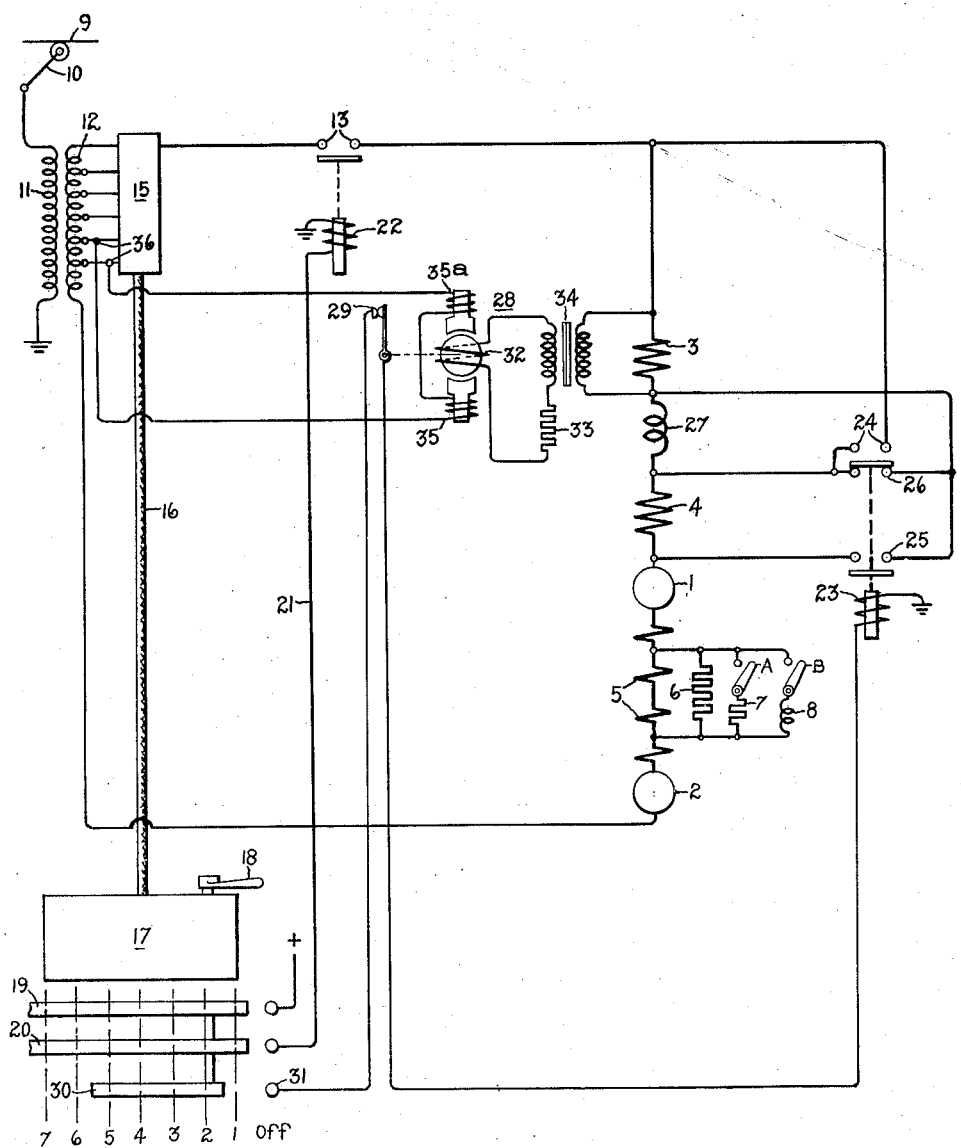
Inventor:
Franklin H. Pritchard,
by Browell S. Mack
His Attorney.

Patented Sept. 28, 1948

2,450,300

UNITED STATES PATENT OFFICE 2,450,300

TRACTION MOTOR CONTROL SYSTEM

Franklin H. Pritchard, Erie, Pa., assignor to General Electric Company, a corporation of New York Application March 26, 1947, Serial No. 737,367

11 Claims. (Cl. 318—244)

My invention relates to motor control systems, and more particularly to a system for controlling the acceleration of single phase alternating current traction motors such as commonly used in electric locomotives.

In my earlier Patent No. 2,241,961, dated May 13, 1941, and assigned to the assignee of the present application, I have described and claimed a system for the acceleration and control of single phase, alternating current railway motors. In this patent, means are provided for starting the locomotive on reduced motor field strength, then automatically changing to an intermediate motor field strength position at a definite motor or vehicle speed, and finally, on the attainment of a second predetermined speed level, reconnecting the traction motor field excitation circuits to provide full field excitation for normal running conditions. While the system shown in my earlier patent is highly satisfactory where it is desirable to provide the three-step field control for alternating current locomotives, and may be modified slightly to provide only two steps of field control where the additional expense and complexity of the three-step control system is not justified, it is an object of my present invention to provide an improved and simplified two-step control system wherein only one switching relay and one reactor are required as compared with the more complex system of multiple reactors and multi-position relays described in the aforementioned patent. In addition, there is a considerable saving in weight, space, original cost, and maintenance.

It is, therefore, an object of my invention to provide a simple and reliable acceleration control system for railway-type single phase alternating current motors.

It is a further object of my invention to provide improved simplified means for starting single phase, alternating current railway motors with reduced field strength, and then transferring to full field strength automatically at a predetermined speed condition and without appreciable change in traction effort.

For a more complete understanding of my invention, reference should now be had to the accompanying drawing, the single figure of which shows in diagrammatic form a system of railway motor control embodying my invention. It should be pointed out in this connection that the accompanying diagram is a simplified schematic showing of the main power circuits and the necessary control circuits required for practising my invention, and it will be obvious that there are certain other refinements and additions relating to running conditions of the locomotive and protective features therefor, but which are not essential to the understanding of my invention which relates solely to an accelerating control system for railway motors.

I have shown my invention as applied to the control of a single phase, alternating current electric locomotive having a pair of single phase traction motors 1 and 2 which are provided with series exciting field windings 3 and 4. The series A.-C. traction motors 1 and 2 may also be provided with interpole series field windings 5, which have the customary interpole field shunting resistor 6. Additional resistance 7 and reactance 8 shunting means are provided for the interpole field windings 5, and are under the control of switches A and B, respectively, which may be conveniently operated by suitable relay means or from the master controller as shown in Patent No. 2,241,961. Single phase alternating current power is supplied to the locomotive from the trolley wire 9 by means of a trolley or current collector 10 which is connected to energize the primary winding 11 of the main locomotive power supply transformer. The secondary winding 12 of the power supply transformer is connected in series circuit relationship with the armatures 1 and 2 and the series field exciting windings 3 and 4 of the traction motors and also in series with the normally open contacts 13 of the main power line switch. In order to vary the alternating current voltage applied to the motor circuit, any desired number of taps, indicated generally at 14, may be provided on the secondary winding of the power transformer 12 and are connected to a suitable tap selecting or switching device 15 which is schematically shown and may be of any type well known in the railway control art. The tap selecting device 15 may be remotely operated, either electrically or electro-pneumatically, by means of the cable 16 from the operator's manual controller 17, in order to select the proper power transformer taps to increase motor voltage as the controller is moved from the "off" position, through the starting positions 1 through 6, and on to the final running positions (not shown). The controller 17 is provided with an operator's handle 18, and is of the conventional drum type having a plurality of operating segments of which only those segments necessary for the practice of my invention have been shown for the sake of simplicity. It will be seen that segments 19 and 20 are effective when the controller is moved from the "off" position to any of the starting or running positions to close the control circuit from the positive side of the D.-C. source, through the conductor 21, the operating coil 22 of the main line switch 13, and back to the negative side of the D.-C. control power. This closes the line switch 13 and applies single phase A.-C. power from the transformer to the motor circuit.

In carrying out my invention for providing reduced motor field excitation on starting and full field excitation for the running condition, a single changeover relay 23, having three sets of contacts 24, 25 and 26, is employed. The contacts 26 form a short circuiting switch for the current limiting reactor 27 which is connected in series relationship between the series field exciting windings 3 and 4 of the motors 1 and 2, respectively. It will be noticed that the changeover relay 23 is shown in the deenergized position, in which position the contacts 26 are closed thereby shorting the reactor 27 and also placing the field windings 3 and 4 in series, inasmuch as the contacts 24 and 25 are open. The motor power circuit may then be traced from one side of the power supply transformer, through the field winding 3, short circuiting contacts 26, field winding 4, armature 1, interpole fields 5, armature 2, and back to the other terminal of the power transformer. Thus the armatures and fields of the traction motors are all in series with each other, which corresponds to the full field or running condition for the locomotive. When the changeover relay 23 is energized, the contact 26 will be opened and contacts 24 and 25 will be closed, thereby placing field windings 3 and 4 and the reactor 27 all in parallel. This corresponds to the reduced field or starting connection for the traction motors.

In order to insure that the changeover relay is operated at a time corresponding to proper locomotive speed for transition from reduced field to full field connection, a speed responsive device 28 is employed to operate a normally closed switch 29 which is placed in series with the energizing coil 23 of the changeover relay and in series with the segment 30 and contact finger 31 of the operator's manual controller 17.

The speed responsive mechanism 28 which may be of any type well known in the art, such as a centrifugally actuated switch mechanism, could be driven by the locomotive axle; however, I prefer the electrically operated speed relay 28 as shown since it may be located in any convenient position, and does not require complex mechanical arrangements for operation by the vehicle axle. The speed responsive relay 28 is described and claimed in Patent No. 1,972,688, issued September 4, 1934, upon a joint application of Jacob W. McNairy and myself and assigned to the same assignee as the present invention. Vehicle speed, or, more specifically, the speed of the motors is indicated by the relay acting in response to the electrical condition of the motors.

The speed relay 28 comprises an armature member having a winding 32 which is connected in series with the resistance 33 and the secondary winding of the coupling transformer 34. The primary winding of the transformer 34 is connected across the field winding 3 of the traction motor 1 and by means of the circuit just described, a voltage directly proportional in magnitude and phase position of that appearing across the field winding 3 is impressed on the rotor winding 32 of the relay. The rotor element of the relay carrying the winding 32 is mechanically connected to the normally closed switch 29.

The stator of the relay is provided with windings 35 and 35a which are placed in series with each other and connected to a pair of selected taps 36 on the main locomotive power transformer, whereby the stator windings are energized with a constant voltage, both in magnitude and phase relation. As the voltage and phase of the current flowing in the rotor winding change, due to varying voltage and power factor in the main traction motor circuit which change with motor speed, the interaction of the relay rotor flux with the stator constant flux produces a torque which is effective to turn the rotor upon the attainment of a predetermined value of voltage and power factor in the motor, corresponding to a particular motor speed, to operate the normally closed switch 29. The circuit to the changeover relay 23 is thereby energized and the transition from reduced field to full field excitation of the traction motors accomplished at the desired motor, and consequently vehicle, speed level.

The manual controller 17 is arranged so that contact segment 30 does not make contact with its co-operating stationary contact finger 31 until the controller has been moved past the first notch and into engagement with the second notch; thus full field is applied to the motors during the initial step of the starting operation. As this corresponds to the lowest voltage tap on the power transformer secondary winding 12, there is no danger of overheating the traction motor or damaging the commutator. Also, when reapplying power with the locomotive coasting, it is desirable to re-apply power initially in the full field connection.

When the controller is advanced to the second notch, the control circuit for energizing the changeover relay is completed by closing the circuit from the positive side of the direct current control power, through the controller segment 30, its stationary contact finger 31, through the normally closed speed switch 29 and the energizing winding of the changeover relay 23. This operates the changeover relay to its picked-up position and closes contacts 24 and 25, thereby placing the series exciting field windings 3 and 4 and the reactor 27 all in parallel. Under these conditions, field exciting current is reduced to less than fifty per cent of the normal full running field strength, and the locomotive may be started without destructive arcing or burning of the commutator due to excessive values of induced currents in the motor armature 1 resulting from a full field excitation under these circumstances. The speed relay 28 is preferably adjusted so that as the locomotive accelerates to a speed of approximately five miles per hour, the speed relay will operate to open the switch 29 thereby interrupting the energizing circuit of the changeover relay 23, opening the contacts 24 and 25, and closing the full field connection contact 26. This places the series field exciting windings 3 and 4 in series with the motor armatures and at the same time short circuits the current limiting reactor 27, corresponding to full excitation of the motor fields 3 and 4.

The controller segment 30 is dimensioned so that at the sixth notch contact with the finger 31 is interrupted and the changeover relay circuit is positively opened by the manual controller 17. The sixth position is set to correspond to a locomotive speed in excess of five miles per hour even under the minimum trolley voltage conditions. Thus, transition to full field connection is assured even though the speed responsive device 28 may have failed or become defective in its operation.

The reactor 27 performs a dual function, acting as a current shunt in parallel with the series field windings 3 and 4 in the reduced field connection, and also acting as a transition reactor during the changeover period to avoid short circuiting or open circuiting the main field circuits. Another advantage to be obtained from my invention is that the reduced field and full field excitation connections, as well as the insertion in the motor circuit of the current limiting reactor during the transition period, are all carried out with the use of only one electromagnetic relay or switching means. Thus a fully automatic two-field strength control for motor acceleration with smooth transition is provided with a minimum of switching apparatus when compared with previous systems in which, although more steps of field control were provided, a disproportionately greater number of switching relays, interlocked switching means and reactors were required.

The field control circuit employed here is similar in one respect to that used in Patent No. 2,241,961 in that a higher motor circuit impedance exists in the full field position as compared to the reduced field position. This in conjunction with transformer regulation and the different values of torque per ampere developed with each field strength tends to keep the motor torque before and after changeover to the same value. There is a slight decrease in torque during transition, the magnitude of which is determined by the amount of shunting employed in the reduced field position.

The following table illustrates the current values obtained in the motor armatures, the motor fields and in the reactor by the use of my invention when applied to a conventional single phase, alternating current locomotive. A value of twenty-five per cent adhesion has been assumed in obtaining the steady state quantities listed below:

| Field Control Position | Armature Amperes | Field Amperes | | Reactor Amperes |
| --- | --- | --- | --- | --- |
| | | Single | Both | |
| Reduced field | 5,000 | 2,300 | 4,600 | 400 |
| Transition | 2,400 | 2,400 | 2,400 | 2,400 |
| Full field | 3,200 | 3,200 | 3,200 | 0 |

Wheel slipping (especially with spring drives) and drawbar surges are affected not only by the magnitude of the torque decrease during transition but by the time duration of the low torque period. The use of a single changeover switch in relay 23 is especially desirable in a system of this type in that it can be designed to operate much faster than a plurality of relays which must necessarily be interlocked in order to operate in proper sequence. Therefore, the transition period from reduced field to full field is appreciably shortened, thereby minimizing wheel slip and undesirable surges in drawbar pull.

It will be understood that the system I have shown and described is not limited to a pair of traction motors, as it can be extended to a locomotive involving any desired number of pairs of driving motors as previously mentioned, and also the particular type of speed responsive device used to control the operation of the changeover relay is not critical.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. A system of control for an alternating current electric motor comprising, a series field winding for said motor, a controller for supplying variable voltage to said motor, a first impedance, a second impedance, switching means operable in one position to connect said first and said second impedances in parallel with said field winding and operable in a second position to short circuit said second impedance and to connect said first impedance in series with said field winding, and motor speed responsive means for actuating said switching means above a predetermined motor speed.

2. A system of control for an alternating current electric motor comprising, a series field winding for said motor, a controller for supplying variable voltage to said motor, a first impedance, a second impedance, electrically operated switching means operable in its energized position to connect said first and said second impedances in parallel with said field winding and operable in its deenergized position to short circuit said second impedance and to connect said first impedance in series with said field winding, and motor speed responsive means for deenergizing said switching means upon attainment of a predetermined motor speed.

3. A system of control for an alternating current electric motor comprising, a series field winding for said motor, a controller for supplying variable voltage to said motor, a first impedance, a second impedance, electrically operated switching means operable in its energized position to connect said first and said second impedances in parallel with said field winding and operable in its deenergized position to short circuit said second impedance and to connect said first impedance in series with said field winding, motor speed responsive means for deenergizing said switching means upon attainment of a predetermined motor speed, and means associated with said controller for deenergizing said switching in a predetermined position of said controller.

4. The combination, in a control system for alternating current electric motors, of a pair of alternating current motors, a series field winding for each motor, a reactor, control means for supplying variable voltage to said motors, switching means for connecting said series field windings and said reactor in parallel in one position and effective to reconnect said series field windings in series circuit relationship and to short circuit said reactor in a second position, and means responsive to motor speed for operating said switching means.

5. The combination, in a control system for alternating current electric motors, of a pair of alternating current motors, a series field winding for each motor, a reactor, control means for supplying variable voltage to said motors, switching means for connecting said series field windings and said reactor in parallel in one position and effective to reconnect said series field windings in series circuit relationship and to short circuit said reactor in a second position, means responsive to motor speed for operating said switching means, and means associated with a certain position of said controller for rendering said speed responsive means ineffective to operate said switching means.

6. The combination, in a vehicle traction motor control system, of a pair of electric traction motors, a series field winding for each of said motors, an impedance element, manually operated control means for varying the voltage applied to said motors, and a two-position electro-magnetic switch operable in response to vehicle speed for connecting said series field windings and said impedance in parallel below a predetermined vehicle speed and operative to re-connect said series field windings in series circuit relationship and to short circuit said impedance in a second position of said switching means corresponding to vehicle speed values above a predetermined minimum.

7. The combination, in a vehicle traction motor control system, of a pair of electric traction motors, a series field winding for each of said motors, an impedance element, manually operated control means for varying the voltage applied to said motors, a two-position electromagnetic switch responsive to motor speed for connecting said series field windings and said impedance in parallel below a predetermined motor speed and operative to re-connect said series field windings in series circuit relationship and to short circuit said impedance in a second position of said switching means corresponding to motor speed values above a predetermined minimum, and means associated with said controller and effective at a predetermined voltage level for positively actuating said switching means to said second position.

8. A system for the control of electric motors comprising, a plurality of electric motors, series field windings for said motors, a current limiting element, switching means operable to connect said field windings and said current limiting element in parallel in one position and operable to re-connect said field windings in series and to short circuit said current limiting element in a second position, and motor speed responsive means for actuating said switching means.

9. A system for the control of electric motors comprising, a source of electric power, a variable voltage controller, a plurality of electric motors, series field windings for said motors, an impedance element, switching means operable to connect said field windings and said impedance element in parallel in one position and operable to reconnect said field windings in series and to short circuit said impedance element in a second position, motor speed responsive means for actuating said switching means, and means associated with a predetermined voltage position of said controller for rendering ineffective said motor speed responsive means.

10. In combination, a control system for alternating current electric vehicle traction motors comprising, a pair of alternating current motors, a series field winding for each motor, a reactor, control means for supplying varying voltage to said motors, electromagnetic switching means for connecting said series field windings and said reactor in parallel in one position and effective to reconnect said series field windings in series circuit relationship and to short circuit said reactor in a second position, and electromagnetic relay means responsive to the electrical conditions of one of said motors for operating said switching means upon attainment of a predetermined electrical condition in said motor.

11. In combination, a control system for alternating current electric vehicle traction motors comprising, a pair of alternating current motors, a series field winding for each motor, a reactor, control means for supplying varying voltage to said motors, electromagnetic switching means for connecting said series field windings and said reactor in parallel in one position and effective to reconnect said series field windings in series circuit relationship and to short circuit said reactor in a second position, electromagnetic relay means responsive to the electrical conditions of one of said motors for operating said switching means upon attainment of a predetermined electrical condition in said motor, and means associated with said control means for rendering said electromagnetic relay means ineffective to operate said switching means.

FRANKLIN H. PRITCHARD.

No references cited.